US011048482B2

(12) United States Patent
Evangelopoulos et al.

(10) Patent No.: US 11,048,482 B2
(45) Date of Patent: Jun. 29, 2021

(54) AUTOMATED IDENTIFICATION OF CODE CHANGES

(71) Applicant: X Development LLC, Mountain View, CA (US)

(72) Inventors: Georgios Evangelopoulos, Venice, CA (US); Benoit Schillings, Los Altos Hills, CA (US); Bin Ni, Fremont, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 0 days.

(21) Appl. No.: 16/523,363

(22) Filed: Jul. 26, 2019

(65) Prior Publication Data

US 2021/0026605 A1    Jan. 28, 2021

(51) Int. Cl.
| | |
|---|---|
| *G06F 8/33* | (2018.01) |
| *G06N 3/04* | (2006.01) |
| *G06N 3/08* | (2006.01) |
| *G06F 8/36* | (2018.01) |
| *G06F 8/71* | (2018.01) |
| *G06F 8/35* | (2018.01) |
| *G06N 3/02* | (2006.01) |

(52) U.S. Cl.
CPC ............... *G06F 8/33* (2013.01); *G06F 8/35* (2013.01); *G06F 8/36* (2013.01); *G06F 8/71* (2013.01); *G06N 3/02* (2013.01); *G06N 3/0445* (2013.01); *G06N 3/08* (2013.01)

(58) Field of Classification Search
None
See application file for complete search history.

(56) References Cited

U.S. PATENT DOCUMENTS

| | | |
|---|---|---|
| 9,324,022 B2 | 4/2016 | Williams, Jr. et al. |
| 2017/0212829 A1 | 7/2017 | Bales et al. |
| 2018/0150742 A1 | 5/2018 | Woulfe et al. |
| 2018/0357062 A1 | 12/2018 | Chichkov |

(Continued)

OTHER PUBLICATIONS

Gu, et al.; DeepAM: Migrate APIs with Multimodal Sequence Learning; IJCAI; pp. 3675-3681; dated 2017.

(Continued)

*Primary Examiner* — Lewis A Bullock, Jr.
*Assistant Examiner* — Mark A Gooray
(74) *Attorney, Agent, or Firm* — Middleton Reutlinger

(57) ABSTRACT

Implementations are described herein for automatically identifying, recommending, and/or automatically effecting changes to a source code base based on updates previously made to other similar code bases. Intuitively, multiple prior "migrations," or mass updates, of complex software system code bases may be analyzed to identify changes that were made. More particularly, a particular portion or "snippet" of source code—which may include a whole source code file, a source code function, a portion of source code, or any other semantically-meaningful code unit—may undergo a sequence of edits over time. Techniques described herein leverage this sequence of edits to predict a next edit of the source code snippet. These techniques have a wide variety of applications, including but not limited to automatically updating of source code, source code completion, recommending changes to source code, etc.

10 Claims, 7 Drawing Sheets

(56) References Cited

U.S. PATENT DOCUMENTS

| | | | |
|---|---|---|---|
| 2019/0228319 A1 | 7/2019 | Gupta et al. | |
| 2020/0097261 A1* | 3/2020 | Smith | G06F 40/30 |
| 2020/0097389 A1* | 3/2020 | Smith | G06N 3/084 |
| 2020/0104102 A1* | 4/2020 | Brockschmidt | G06F 8/34 |

OTHER PUBLICATIONS

Nguyen, et al.; Grapacc: A graph-based pattern-oriented, context sensitivity; Iowa State University; 4 pages; dated 2012.

Nguyen, et al.; Graph Based Statistical Language Model for Code; Iowa State University; 11 pages; dated 2015.

Chen, et al.; Literature Study of Embeddings on Source Code; pp. 1-8; dated Apr. 5, 2019.

Fan, et al.; Software Defect Prediction via Attention-Based Recurrent Neural Network; Hindawi;Scientific Programming; pp. 1-14; dated 2019.

Allamanis, et al.; Survey of Machine Learning for Big Code and Naturalness; pp. 1-36 ; dated 2018.

Katz, et al.; Using Recurrent Neural Networks for Decompilation; IEEE; pp. 346-356; dated 2018.

Chakraborty, S. et al., "Tree2Tree Neural Translation Model for Learning Source Code Changes," Cornell University, arXiv.org, arXiv:1810.00314v1; 12 pages; Sep. 30, 2018.

Tufano, M. et al., "On Learning Meaningful Code Changes via Neural Machine Translation;" Cornell University, arXiv.org, arXiv:1901.09102v1; 12 pages; Jan. 25, 2019.

Goodfellow, I. et al., "Chapter 5—Machine Learning Basics;" retrieved from internet: URL:http://www.deeplearningbook.org/contents/ml.html; pp. 96-161; 2016.

European Patent Office; International Search Report and Written Opinion of PCT Ser. No. PCT/US2020/042953; 12 pages; dated Nov. 11, 2020.

\* cited by examiner

SEARCH_RESULTS.CC EDIT SUGGESTIONS

☑ CHANGE "CUST_A_AR" TO "custAAR"

▶ SEE HISTORY

☑ ADD "stopGap = stopGap/CONSTANT_RATE;" to line 6

▶ SEE HISTORY

☑ CHANGE "DEFAULT: COUT >> "NO MATCH FOUND"" TO
"DEFAULT: COUT >> "TRY A DIFFERENT TERM""

▼ SEE HISTORY

| | |
|---|---|
| 11/13/14: | INITIAL CREATION |
| 12/20/15: | ADDED "CASE (X=2): COUT >> "TWO RESULTS FOUND"" |
| 01/22/16: | ADDED "CASE (X>100): COUT >> "TRY NARROWING YOUR SEARCH"" |

[ ACCEPT CHANGE(S) ]

Fig. 4        460

AUTOMATED IDENTIFICATION OF CODE CHANGES

BACKGROUND

A software system is built upon a source code "base," which typically depends on and/or incorporates many independent software technologies, such as programming languages (e.g. Java, Python, C++), frameworks, shared libraries, run-time environments, etc. Each software technology may evolve at its own speed, and may include its own branches and/or versions. Each software technology may also depend on various other technologies. Accordingly, a source code base of a large software system can be represented with a complex dependency graph.

There are benefits to keeping software technologies up to date. Newer versions may contain critical improvements that fix security holes and/or bugs, as well as include new features. Unfortunately, the amount of resources sometimes required to keep these software technologies fresh, especially as part of a specific software system's code base, can be very large. Consequently, many software systems are not updated as often as possible. Out-of-date software technologies can lead to myriad problems, such a bugs, security vulnerabilities, lack of continuing support, etc.

SUMMARY

Techniques are described herein for automatically identifying, recommending, and/or automatically effecting changes to a source code base based on updates previously made to other similar code bases. Intuitively, multiple prior "migrations," or mass updates, of complex software system code bases may be analyzed to identify changes that were made. More particularly, a particular portion or "snippet" of source code—which may include a whole source code file, a source code function, a portion of source code, or any other semantically-meaningful code unit—may undergo a sequence of edits over time. Techniques described herein leverage this sequence of edits to predict a next edit of the source code snippet. These techniques have a wide variety of applications, including but not limited to automatically updating of source code, source code completion, recommending changes to source code, etc.

Data indicative of the sequence of edits may then be applied as input across a time-based or memory-based machine learning model, such as a recurrent neural network, a long short-term memory ("LSTM") network, a gated recurrent unit ("GRU") network, a transformer network, etc. At each iteration, the output may be indicative of a predicted next edit in the sequence of edits. Accordingly, once the machine learning model is trained and provided data indicative of a sufficient number of edits, the machine learning model may generate output that can be used to predict the next edit to be made to the source code snippet.

In some implementations, a sequence of source code edits may be represented by a sequence of graphs. For example, each iteration or version of a source code snippet may be converted into an abstract syntax tree ("AST"), resulting in a sequence of ASTs. In some such implementations, a set of candidate source code edits may be defined for individual nodes. These candidate source code edits may include actions such as insert, delete, modify, move, update, etc. In some implementations, the output generated at each iteration of the machine learning model may include a distribution over this defined set of candidate source code edits. Predicting the next edit action may be based on this distribution.

In some implementations, each AST is converted into a latent space embedding prior to being applied as input across the machine learning model. This latent space conversion may be implemented using various different graph-based machine learning models, including but not limited to a graph neural network ("GNN"), a graph convolutional network ("GCN"), a graph attention network ("GAN"), etc. In some such implementations, a GNN may include multiple recurrent nodes and multiple candidate source code edits per node.

In some implementations, a method performed by one or more processors is provided that includes: accessing a sequence of edits made to a source code snippet over time; applying data indicative of the sequence of edits as input across a machine learning model to generate output; and based on the output generated from the applying, predicting a next edit of the source code snippet following the sequence of edits.

In various implementations, the applying comprises iteratively applying each edit of the sequence of edits as input across the machine learning model to generate a respective sequence of outputs, and the next edit is predicted based on a final output of the sequence of outputs. In various implementations, the machine learning model comprises a recurrent neural network.

In various implementations, the data indicative of the sequence of edits comprises a respective sequence of graphs. In various implementations, the data indicative of the sequence of graphs comprises a sequence of respective latent space embeddings generated from the sequence of graphs. In various implementations, each latent space embedding of the sequence of latent space embeddings is generated by applying a respective graph of the sequence of graphs as input across a graph neural network ("GNN"). In various implementations, each graph of the sequence of graphs comprises an abstract syntax tree.

In various implementations, the output generated from the applying comprises a distribution over a set of candidate source code edits, and the predicting is based on the distribution. In various implementations, the source code snippet is part of a to-be-updated code base, and the accessing comprises accessing, from a different code base than the to-be-updated code base, the sequence of edits made to the source code snippet over time.

In another aspect, a method implemented using one or more processors may include: accessing a sequence of edits made to a source code snippet over time; applying data indicative of a first subset of the sequence of edits as input across a machine learning model to generate output; based on the output generated from the applying, predicting a next edit of the source code snippet following the first subset of the sequence of edits; comparing the predicted next edit to an edit contained in a second subset of the sequence of edits to determine an error, wherein the second subset is disjoint from the first subset; and training the machine learning model based on the error.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 schematically demonstrates one example of a graphical user interface that may present suggested edits to a user, in accordance with various implementations.

DETAILED DESCRIPTION

Figure 1:
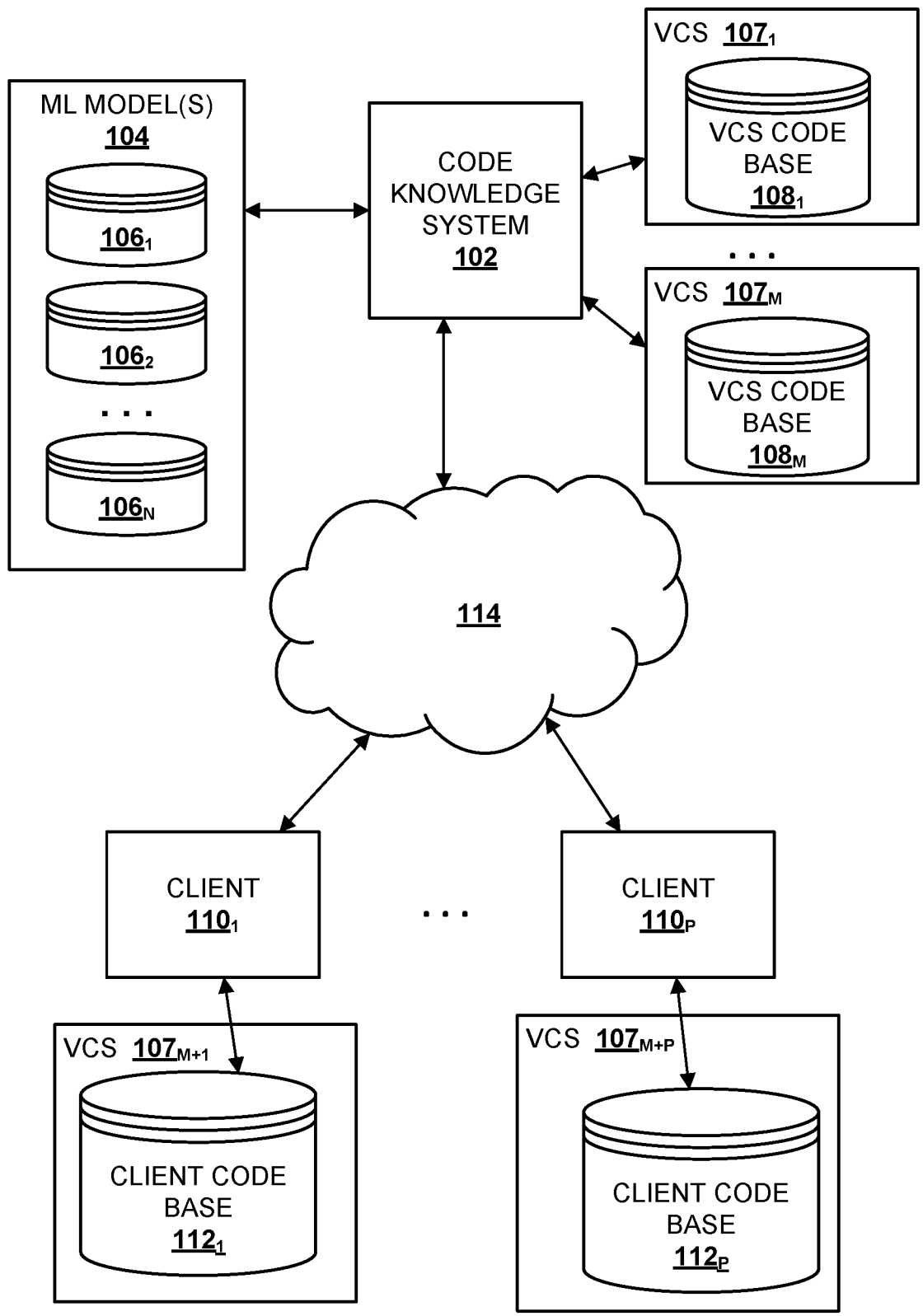
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

Code knowledge system 102 may be configured to perform selected aspects of the present disclosure in order to help one or more clients $110_{1-P}$ to update one or more corresponding code bases $112_{1-P}$. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancellations of flight, managing people associated with flights, such as passengers, air crews, and ground crews, managing airport gates, and so forth.

Many of these entities' software systems may be mission critical. Even a minimal amount of downtime or malfunction can be highly disruptive or even catastrophic for both the entity and, in some cases, the safety of its customers. Moreover, a given code base 112 may be relatively large, with a complex dependency graph. Consequently, there is often hesitation on the part of the entity 110 running the software system to update its code base 112.

Code knowledge system 102 may be configured to leverage knowledge of past code base updates or "migrations" in order to streamline the process of updating a code base underlying an entity's software system. For example, code knowledge system 102 may be configured to recommend specific changes to various pieces of source code as part of a migration. In some implementations, code knowledge system 102 may even implement source code changes automatically, e.g., if there is sufficient confidence in a proposed source code change. In various implementations, code knowledge system 102 may identify these recommendations and/or automatic edits using techniques described herein, including analyzing sequences of edits made to source code snippets over time. These sequences of edits may be used to train a statistical model such as the various machine learning models described herein to predict subsequent edits to source code snippets.

In various implementations, code knowledge system 102 may include a machine learning ("ML" in FIG. 1) database 104 that includes data indicative of one or more trained machine learning models $106_{1-N}$. These trained machine learning models $106_{1-N}$ may take various forms that will be described in more detail below, including but not limited to a graph neural network ("GNN"), a sequence-to-sequence model such as various flavors of a recurrent neural network (e.g., long short-term memory, or "LSTM", gate recurrent units, or "GRU", etc.) or an encoder-decoder, and any other type of machine learning model that may be applied to facilitate selected aspects of the present disclosure, such as a transformer machine learning model.

In some implementations, code knowledge system 102 may also have access to one or more version control systems ("VCS"), each with a respective code bases 108 that it manages. A VCS 107 may facilitate revision control of source code snippets contained in a code base 108. Revision control may include, for instance, the ability to revert a source code file to previous version(s), the ability to see who has modified a source code file, the ability to update a source code file as part of a larger migration or replatforming, the ability to access previous versions of source code snippets, etc.

Code bases $108_{1-M}$ be used, for instance, to train one or more of the machine learning models $106_{1-N}$. In some such implementations, and as will be described in further detail below, multiple different versions of source code snippets stored in code bases $108_{1-M}$ by their respective VCS's $107_{1-M}$ may be used to train machine learning models $106_{1-N}$, to predict source code edits. As used herein, a code base 108 being deemed "up-to-date" is not meant to require that all the source code in the code base 108 be the absolute latest version. Rather, "up-to-date" may refer to a desired state of the code base 108 and/or of its constituent components (e.g., source code files, libraries, etc.), whether that desired state is the most recent version code base, the most recent version of the code base that is considered "stable," the most recent version of the code base that meets some other criterion (e.g., dependent on a particular library, satisfies some security protocol or standard), etc. As shown in FIG. 1, some clients 110 may also manage their code bases $112_{1-N}$ using respective VCSs $107_{m+1\ M+P}$.

In various implementations, a client 110 that wishes to update its code base 112 may establish a relationship with an entity (not depicted in FIG. 1) that hosts code knowledge system 102. In some implementations, code knowledge system 102 may then access all or parts of the client's source code base 112 (with the client's consent), e.g., over one or more networks 114 such as the Internet, and return to the client 110 data indicative of recommended changes, or even updated source code. In other implementations, e.g., where the client's code base 112 being updated is massive, one or more representatives of the entity that hosts code knowledge system 102 may travel to the client's site(s) to perform updates and/or make recommendations.

Figure 2:
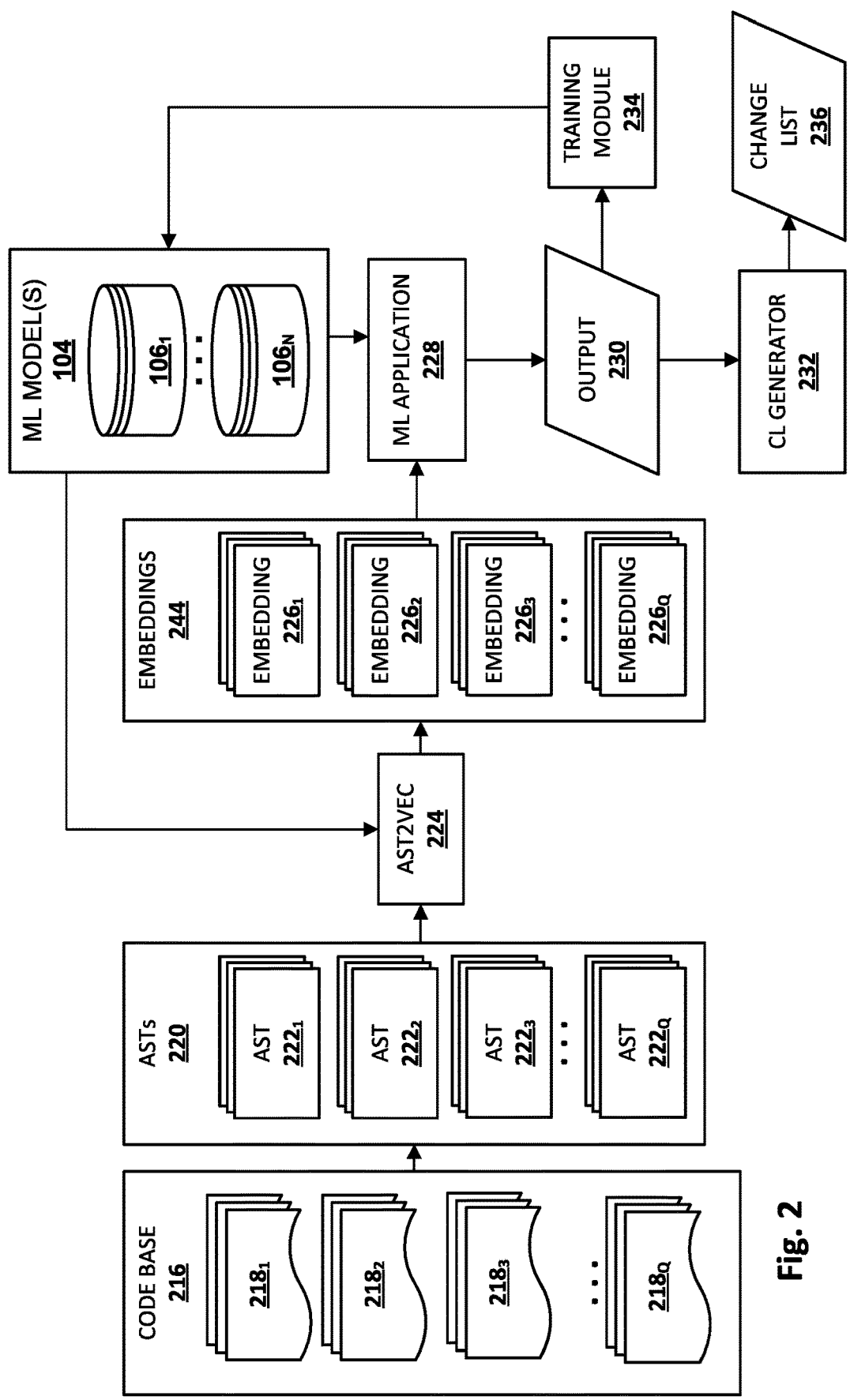
FIG. 2 is a block diagram of an example process flow.

FIG. 2 is a block diagram of example process flow(s) that may be implemented in whole or in part by code knowledge system 102, during training of machine learning models $106_{1-N}$ and/or during use of those models ("inference") to predict what changes should/can be made to a code base 112. Unless otherwise indicated, various components in FIG. 2 may be implemented using any combination of hardware and computer-readable instructions.

Beginning at left, a codebase 216 (which may correspond to a code base 108 and/or an entity's code base 112) may include one or more source code snippets $218_{1-Q}$ of one or more types. Q is a positive integer that corresponds to the number of source code snippets in code base 216 that are considered individually, e.g., for processing using techniques described herein. Source code snippets 218 need not all be written in the same programming language. For example, in some cases a first source code snippet $218_1$ may be written in Python, another source code snippet $218_2$ may be written in Java, another $218_3$ in C/C++, and so forth. Additionally or alternatively, each of source code snippets $218_{1-Q}$ may represent one or more source code snippets from a particular library, entity, and/or application programming interface ("API").

Each source code snippet 218 may comprise a semantically-meaningful portion of a source code file or an entire source code file, depending on the circumstances. For example, a particularly large source code file may be broken up into smaller snippets (e.g., delineated into functions, objects, etc.), whereas a relatively short source code file may be kept intact throughout processing.

As indicated by the sequence of multiple blocks representing each source code snippet 218, for each source code snippet 218, there may be a sequence of versions of the source code snippet, e.g., managed by a VCS 107 (see FIG. 1) associated with code base 216. While three blocks are shown for each snippet 218 in FIG. 2, this is not meant to be limiting. In various implementations, any given source code snippet 218 may have been edited any number of times during its life cycle, including zero times (i.e. the source code snippet remains in its original form), and there is no requirement that each source code snippet 218 have been edited the same number of times.

At least some of the source code snippets $218_{1-Q}$ of code base 216 may be converted into an alternative form, such as a graph or tree form, in order for them to be subjected to additional processing. For example, in FIG. 2, source code snippets $218_{1-Q}$ are processed to generate abstract syntax trees ("AST") 220, including individual ASTs $222_{1-Q}$. An AST 222 may represent constructs occurring in a given source code snippet, such as variables, objects, functions, etc., as well as the syntactic relationships between these components. Once again, and as indicated by the multiple blocks representing each AST 222 of ASTs 220 in FIG. 2, ASTs 220 may include a sequence of ASTs 222 for a given source code snippet 218, corresponding to the sequence of versions of the source code snippet 218.

An AST2VEC component 224 may be configured to generate, from ASTs $222_{1-Q}$, feature vectors, or "latent space" embeddings 244, including individual embeddings $226_{1-Q}$. In some implementations, AST2VEC component 224 may apply AST sequences $222_{1-Q}$ as input across one or more machine learning models 106 to generate respective latent space embeddings $226_{1-Q}$. The machine learning models 106 may take various forms as described previously, such as a GNN 252, an encoder of an encoder-decoder model, a GCAN, a GAN, etc. Once again, and as indicated by the multiple blocks representing each embedding 226 in FIG. 2, each embedding 226 may include a sequence of embeddings corresponding to a sequence of ASTs 222, and ultimately, corresponding to the sequence of versions of the source code snippet 218.

A machine learning ("ML") application module 228 may be configured to apply embeddings $226_{1-Q}$ as input across one or more machine learning models 106 to generate output 230. This output may be indicative of a predicted next edit of a source code snippet 218 following the sequence of edits made to the source code snippet 218. Output 230 of ML application module 228 take various forms, such as a latent space embedding, a distribution of probabilities, etc. In some implementations, the same machine learning model 106 used to generate output 230 or a different machine learning model 106 may include a softmax layer, a trained decoder portion, etc., that generates, based on output 230, additional output indicative of one or more predicted edits to the original input source code snippet 218. For example, in FIG. 2, a change log ("CL") generator 232 receives output 230 and generates a change list 236 that identifies edit(s) to be made to the original source code snippet 218. In other implementations, output 230 may be used to generate a new AST that corresponds to the original input source code snippet 218 edited with the predicted edits represented in output 230.

A loss function of the applicable machine learning model may be, in some cases, a difference between a predicted next edit and a ground truth next edit that was actually made to the source code snippet. Accordingly, during training, a training module 234 may be configured to compare output 230 to data indicative of known edits made to source code snippets 218 to determine an error. Suppose a source code snippet 218 has undergone x edits over time (x being a positive integer). A sequence of the first x−1 edits made to the source code snippet 218 may be processed using the components depicted in FIG. 2 to yield x−1 embeddings 226 representing the first x−1 edits made to the source code snippet 218. The xth edit may then be used, e.g., by training module 234, to train one or more machine learning models 106.

In some implementations, data indicative of the first x−1 edits, such as a sequence of x−1 latent space embeddings 226, may be iteratively applied in sequence as input across one or more machine learning models 106, such as a RNN, LSTM, GRU, etc., to generate output 230. The output 230 may then be compared with data indicative of the xth edit to determine an error. That error may be used, e.g., by training module 234, to modify weights and/or parameters of the machine learning model, e.g., using techniques such as back propagation, gradient descent, etc.

Once the machine learning models (e.g., $106_{1-N}$) are adequately trained, they may be applied during an inference phase to help new clients migrate their yet-to-be-updated code bases. The inference phase may operate similarly as the training phase just described. However, instead of training module 234 training machine learning models $106_{1-N}$ based on the previously-described loss function, output 230 is used, e.g., by CL generator 232, to generate change list 236 (also referred to as an "edit script") that conveys the predicted next edit(s) to the original input source code snippet(s) 218.

In some cases, a code base, or more particularly, a VCS that maintains the code base, may not include a sequence of edits made to a particular source code snippet. It might be the case that the source code snippet hasn't been edited since installation, which means the source code snippet is, at least relative to its local code base, in its original form. However, such an original-form source code snippet can nevertheless be used to predict edits. For example the source code snippet itself may be processed using components such as those depicted in FIG. 2 into a latent space embedding, and then applied as input across a machine learning model such as an RNN to generate output (230 in FIG. 2) that represents a predicted next edit. While this particular prediction may not have the benefit of previous edits to the source code snippet behind it, if the machine learning model is adequately trained, its output may still be helpful to determine an edit to be made to the source code snippet. Alternatively, in some implementations, prior edits made to the source code snippet in other code bases may be substituted for prior edits lacking in the present code base. The operations of FIG. 2 can then be performed with the benefit of prior edits, even if those edits were performed in a different code base.

Figure 3:
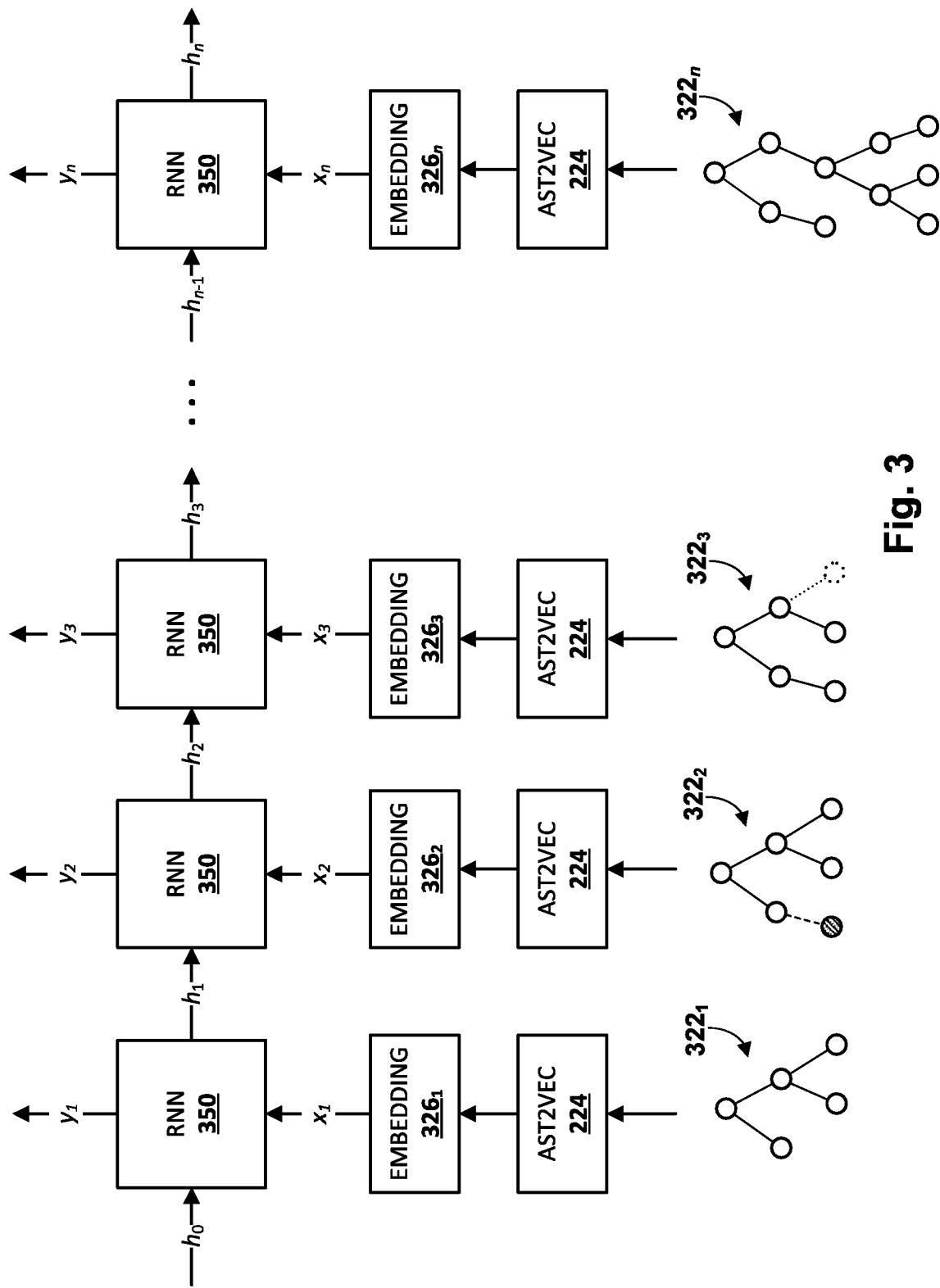
FIG. 3 schematically demonstrates one example of how a recurrent neural network may be used to implemented selected aspects of the present disclosure.

FIG. 3 schematically illustrates one example of how a RNN 350 may be used to predict future edits of a source code snippet. This example is not meant to be limiting, and the machine learning model(s) trained and used to predict next edits is not limited to an RNN, LSTM, GRU, or even to a sequence-to-sequence model. For example, in some implementations, a transformer neural network may be trained to perform selected aspects of the present disclosure, such as predicting next edits.

In FIG. 3, RNN 350 is depicted in an "unfolded" state to demonstrate how a single RNN 350 is applied in iterations to a sequence of inputs $x_{1-n}$ to generate a sequence of outputs $y_{1-n}$. Starting at bottom left, at time i−1, a first AST $322_1$ generated from a first version of a source code snippet (not depicted) is processed by AST2VEC component 224 to generate a first embedding $326_1$. As noted previously, AST2VEC component 224 may generate first embedding $326_1$ using various techniques, including but not limited to various graph-based machine learning models, such as GNNs, GANs, GCNs, etc.

First embedding $326_1$ may then be applied as input $x_1$ during time i=1 across RNN 350 to generate output $y_1$. At the same time, upstream memory-data $h_0$ is also applied as input across RNN 350. Because AST $322_1$ corresponds to a first edit of a sequence of edits made to the source code snippet, $h_0$ may be null or zeroed out at this point. Based on $x_1$ and $h_0$, during time i=1, RNN 350 generates output $y_1$. In various implementations, output $y_1$ may represent a prediction of a next edit to be made to the underlying source code snippet based on $x_1$ and $h_0$.

During time i=2, a second AST $322_2$ representing a first edited version of the source code snippet (in which a node is added at bottom left) is processed by AST2VEC component 224 to generate second embedding $326_2$. Second embedding $326_2$ is applied as input $x_2$ across RNN 350 to generate second output $y_2$. Additionally, at least some data associated with the previous iteration (time i=1) is passed as additional input $h_1$ to RNN 350. Based on these inputs, RNN 350 generates, during time i=2, second output $y_2$.

During time i=3, a third AST $322_3$ representing a second edited version of the source code snippet—which deletes a node at bottom right—is processed by AST2VEC component 224 to generate third embedding $326_3$. Third embedding $326_3$ is applied as input $x_3$ across RNN 350, along with data $h_2$ carried over from the previous iteration, to generate second output $y_2$. Based on these inputs, RNN 350 generates, during time i=2, second output $y_2$. Second output $y_2$ may represent a prediction of what the next edit to the underlying source code snippet will be during the next iteration i=4.

The operations depicted in FIG. 3 may continue until n versions of the source code snippet are processed. n may be a positive integer that is equal to the number of edits that have been made to the source code snippet over time, e.g., while the source code snippet has been part of a code base. The final output $y_n$ may represent a prediction of the next edit to be made to the source code snippet during the iteration i=n+1. This may be represented in a subsequence AST (not depicted) that adds a node to, deletes a node from, or otherwise modifies the final AST $322_n$ depicted in FIG. 3.

As noted previously, in some implementations, AST2VEC component 224 may use machine learning models that operate on graph input. With GNNs, for example, the graph input may take the form of ASTs. Features (which may be manually selected or learned during training) may be extracted for each node of the AST to generate a feature vector for each node. Nodes of each AST may represent a variable, object, or other programming construct. Accordingly, features of the feature vectors generated for the nodes may include features such as variable type (e.g., int, float, string, pointer, etc.), name, operator(s) that act upon the variable as operands, etc. A feature vector for a node at any given point in time may be deemed that node's "state." Meanwhile, each edge of the AST may be assigned a machine learning model, e.g., a particular type of machine learning model or a particular machine learning model that is trained on particular data.

Then, for each time step of a series of time steps, feature vectors, or states, of each node may be propagated to their neighbor nodes along the edges/machine learning models, e.g., as projections into latent space. In some implementations, incoming node states to a given node at each time step may be summed (which is order-invariant), e.g., with each other and the current state of the given node. As more time steps elapse, a radius of neighbor nodes that impact a given node of the AST increases.

Intuitively, knowledge about neighbor nodes is incrementally "baked into" each node's state, with more knowledge about increasingly remote neighbors being accumulated in a given node's state as the machine learning model is iterated more and more. In some implementations, the "final" states for all the nodes of the AST may be reached after some desired number of iterations is performed. This number of iterations may be a hyper-parameter of the GNN. In some such implementations, these final states may be summed to yield an overall state or embedding of the AST.

FIG. 4 depicts an example graphical user interface ("GUI") 460 that may be rendered, for instance, as part of a software development application that is operated by personnel associated with a client 110. GUI 460 provides the user (e.g., a computer programmer or software engineer) with suggestions for a source code file entitled "SEARCH_RESULTS.CC". In FIG. 4, each suggestion is accompanied by a check box that, if left checked when an "ACCEPT CHANGES" button is activated, causes the suggestion to be automatically implemented in the code base.

In some implementations, each suggestion may correspond to a different portion, or snippet, of SEARCH_RESULTS.CC. For example, the first suggestion is to change the name of a variable from "CUST_A_AR" to "CustAAR." The second suggestion is to add some code to line 6 of SEARCH_RESULTS.CC. The third suggestion is change output provided by a default switch statement case from one text snippet to another. In other cases, multiple suggestions may be made for a single source code snippet.

Beneath each suggestion is a selectable element, "SEE HISTORY," which is selectable to allow a user to see an edit history of the underlying source code snippet. In FIG. 4 these selectable elements take the form of expandable lists, but this is not meant to be limiting. Such selectable elements may take variety of different forms (e.g., hyperlinks, buttons, speech input suggestions, etc.) and may cause a variety of different interface types (e.g., separate GUI, pop-up window, etc.) to be rendered. In FIG. 4, selection of a selectable element causes expansion of the list. An example of this is depicted underneath the third suggestion, where the selectable element has been selected. This selection caused the list to expand and show changes made to the source code snippet since its addition to the code base. The edit history may, among other things, inform the user as to why the suggested edit is being made.

Figure 5:
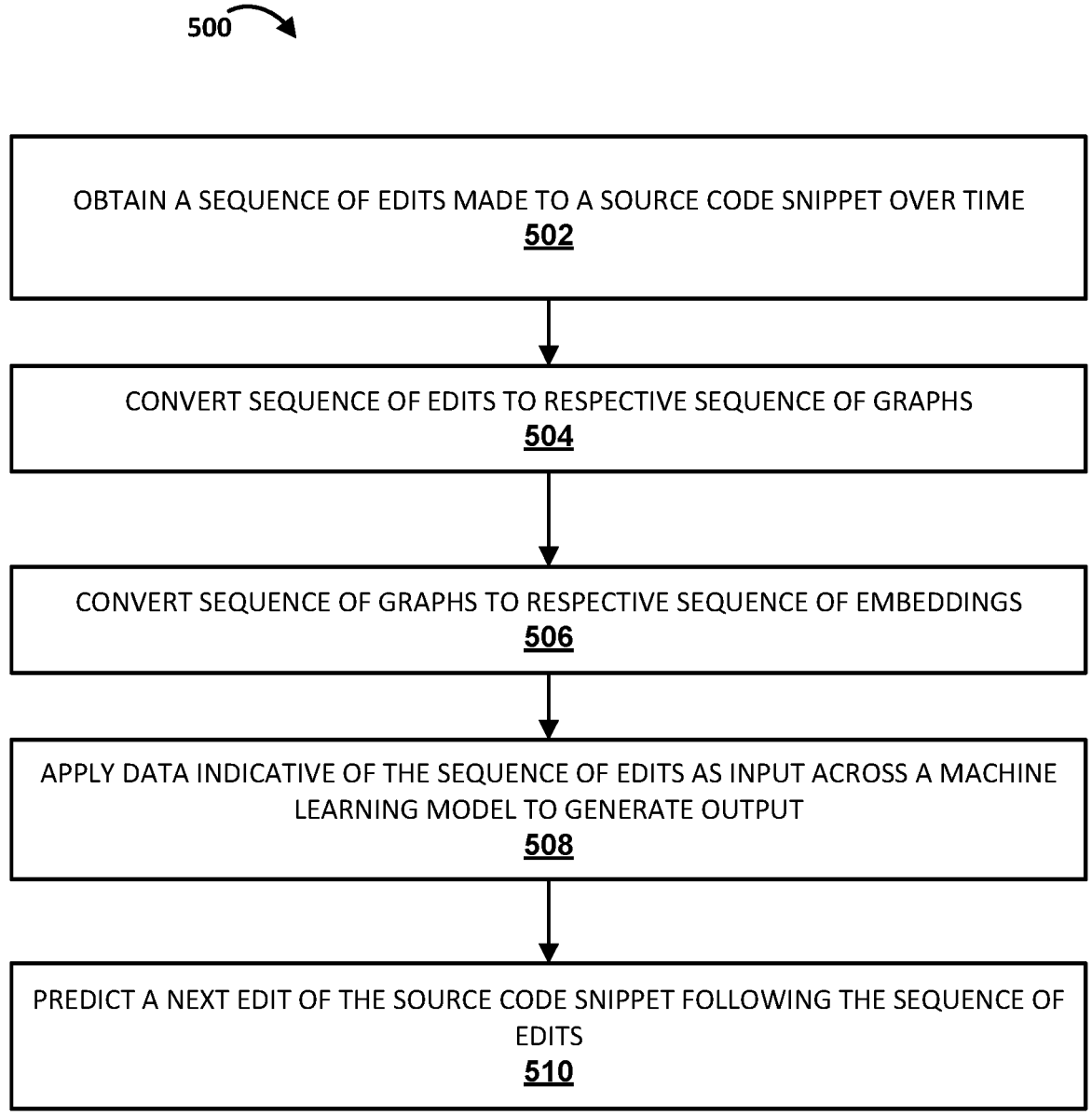
FIG. 5 depicts a flowchart illustrating an example method according to implementations disclosed herein.

FIG. 5 is a flowchart illustrating an example method 500 of utilizing a trained machine learning model during an inference stage to predict source code edits, in accordance with implementations disclosed herein. For convenience, the operations of the flow chart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted or added.

At block 502, the system may access a sequence of edits made to a source code snippet over time. These edits may be provided, for instance, by a version control system ("VCS") such as those depicted in FIG. 1. In some implementations, the entire sequence may be accessed from the same code base/VCS. In other implementations, particularly where a given source code snippet might not have an extensive history within a particular code base/VCS, prior edits of the source code snippet from other code base(s)/VCS's may be accessed and used as substitutes, e.g., so that the machine learning techniques described herein may have "richer" data from which to predict source code edits.

At block 504, the system may convert the sequence of edits to a respective sequence of graphs, such as a respective sequence of ASTs $222_{1-Q}$. At block 506, the system, e.g., by way of AST2VEC component 224, may convert the sequence of graphs to a respective sequence of latent space embeddings. In some implementations, the graphs may be converted to latent space embeddings using a graph-based machine learning model such as a GNN, GAN, GCN, etc.

At block 508, the system, e.g., by way of ML application module 228, may apply data indicative of the sequence of edits—in this example, the sequence of latent space embeddings—as input across a machine learning model to generate output. In some implementations, the applying of block 504 may include the system iteratively applying each edit of the sequence of edits (e.g., a respective set of graphs, or a respective set of latent space embeddings generated from the respective sequence of graphs) as input across the machine learning model to generate a respective sequence of outputs. In some such implementations, the machine learning model may be a memory-based and/or sequence-to-sequence machine learning model such as an RNN (350), LSTM, GRU, etc. In other implementations, the machine learning model may take other forms, such as a transformer neural network.

Based on the output generated from the applying at block 508, at block 510, the system, e.g., by way of CL generator 232, may predict a next edit of the source code snippet following the sequence of edits. This prediction may take various forms. In some implementations, the output generated by the machine learning model at block 508 may take the form of a distribution over a set of candidate source code edits. For example, in some implementations, a set of candidate source code edits (e.g., INSERT, DELETE, MODIFY, MOVE, etc.) may be defined ahead of time. In some such implementations, the predicting of block 506 may be based on the distribution, i.e., the machine learning model may be trained to map sequences of prior source code edits to the candidate source code edits. In some such implementations, the candidate source code edit having the highest probability or confidence measure may be selected as the prediction. If multiple candidate source code edits have similarly high probabilities/confidences, then the multiple candidate source code edits may be presented to a user as options.

Additionally or alternatively, in some implementations, the output (e.g., 230) of the machine learning model (e.g., RNN 350) generated at block 508 may be a latent space embedding. In some such implementations, a downstream layer or component may be provided that generates an edit script or change list based on the output latent space embedding. For example, a softmax layer, a sigmoid layer, a trained decoder, or other similar component may be provided to generate, based on the latent space embedding, one or more source code edits. In some implementations, the output of the machine learning model (or of an additional downstream component) may be an AST with the predicted edits already made. In some such implementations, the AST may be converted into a source code snippet.

Figure 6:
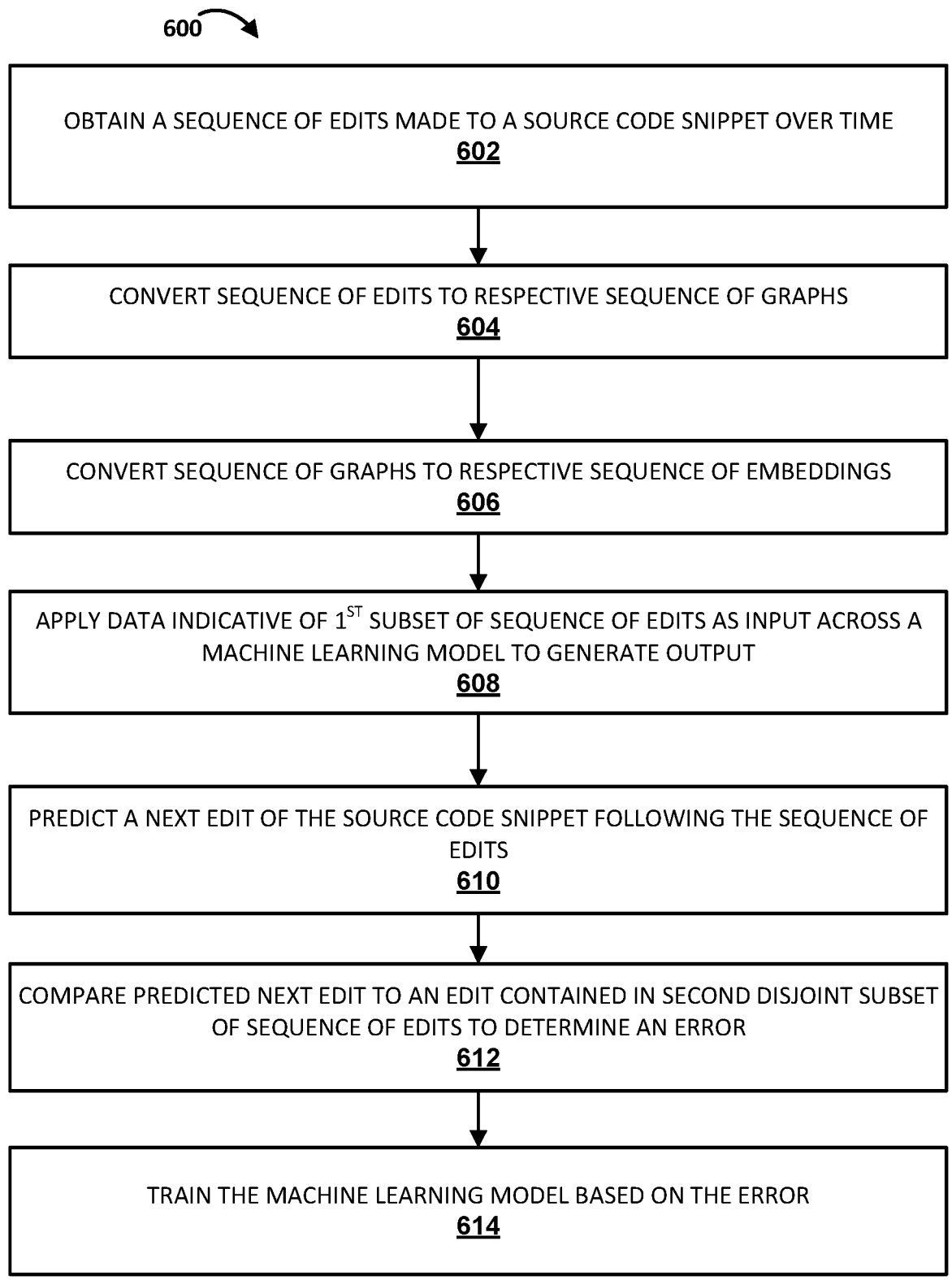
FIG. 6 depicts a flowchart illustrating another example method according to implementations disclosed herein.

FIG. 6 is a flowchart illustrating an example method 600 of training a machine learning model such as RNN 350 to predict source code edits, in accordance with implementations disclosed herein. For convenience, the operations of the flow chart are described with reference to a system that performs the operations. This system may include various components of various computer systems, such as one or more components of code knowledge system 102. Moreover, while operations of method 600 are shown in a particular order, this is not meant to be limiting. One or more operations may be reordered, omitted or added.

At block 602, the system may access a sequence of edits made to a source code snippet over time. At block 604, the system may convert the sequence of edits to a respective sequence of graphs, such as a respective sequence of ASTs $222_{1-Q}$. At block 606, the system, e.g., by way of AST2VEC component 224, may convert the sequence of graphs to a respective sequence of latent space embeddings. The operations of blocks 604-606 may be similar to the operations of blocks 504-506 in some implementations.

At block 608, the system, e.g., by way may apply data indicative of a first subset of the sequence of edits, such as all the edits except the final edit, as input across a machine learning model to generate output. Notably, a second subset of edits, which may include the last edit (or multiple edits at the end of the sequence if desired) is preserved for training purposes. Based on the output generated from the applying at block 608, at block 610, the system may predict a next edit of the source code snippet following the first subset of the sequence of edits. Operations 608-610 may be similar to operations 508-510 of FIG. 5.

At block 612, the system, e.g., by way of training module 234, may compare the predicted next edit to an edit contained in the second subset of the sequence of edits to determine an error. The second subset of the sequence of edits may be disjoint from the first subset, and may include the last one or more edits of the sequence that were excluded from the first subset that was applied at block 608. At block 614, the system may train the machine learning model based on the error, e.g., using techniques such as back propagation, gradient descent, etc.

Figure 7:
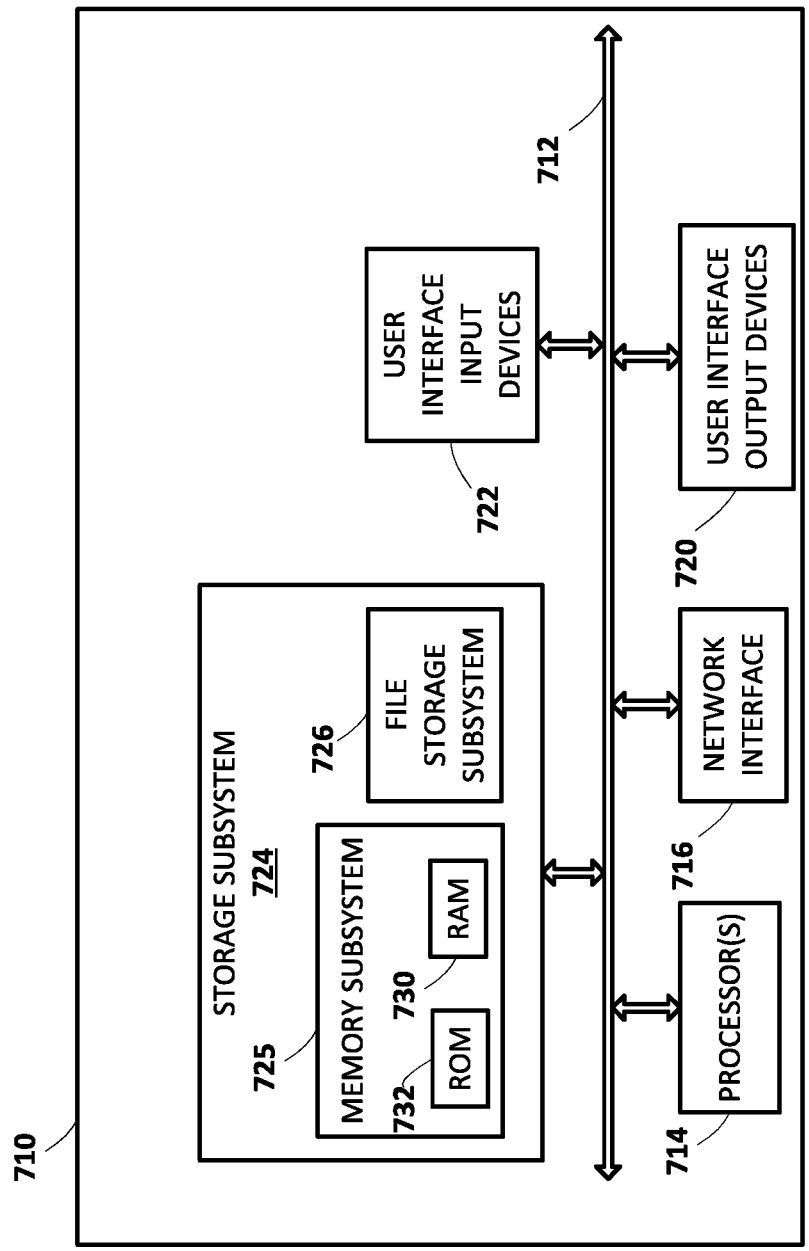
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 5-6, as well as to implement various components depicted in FIGS. 1-2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    accessing, from a code base, a sequence of edits made to a source code snippet over time;
    converting the sequence of edits to a corresponding sequence of graphs;
    independently applying each of the sequence of graphs as input across a graph neural network (GNN) model to generate a respective sequence of edit embeddings;
    iteratively applying each edit embedding of the sequence of edit embeddings as input across a recurrent neural network (RNN) to generate a respective sequence of outputs, wherein additional data generated from a previous iteration is applied as additional input across the RNN during the next iteration and each iteration produces an output that may represent a prediction of what the next edit to the source code snippet will be;
    once all of the edit embeddings have been iteratively applied across the RNN, determining the final output from the last iteration of the sequence of outputs generated based on the RNN, wherein the final output includes the predicted next edit of the source code snippet; and
    applying the next edit as a snippet in the code base or a different code base.

2. The method of claim 1, wherein each graph of the sequence of graphs comprises an abstract syntax tree.

3. The method of claim 1, wherein each of the outputs generated from the iteratively applying comprises a distribution over a set of candidate source code edits.

4. The method of claim 1, wherein the next edit is applied as the snippet in the different code base.

5. A method implemented using one or more processors, comprising:
- accessing, from a code base, a sequence of edits made to a source code snippet over time;
- converting the sequence of edits to a corresponding sequence of graphs;
- independently applying each of the sequence of graphs as input across a graph neural network (GNN) to generate a corresponding sequence of edit embeddings;
- iteratively applying each edit embedding of the sequence of edit embeddings as input across a recurrent neural network (RNN) to generate a corresponding sequence of outputs, wherein additional data generated from a previous iteration is applied as additional input across the RNN during the next iteration and each iteration produces an output that may represent a prediction of what the next edit to the source code snippet will be;
- based on the sequence of outputs, predicting a next edit of the source code snippet following a first subset of the sequence of edits;
- comparing the predicted next edit to an edit contained in a second subset of the sequence of edits to determine an error, wherein the second subset is disjoint from the first subset; and
- training the GNN or RNN based on the error.

6. The method of claim 5, wherein each graph of the sequence of graphs comprises an abstract syntax tree.

7. A system comprising one or more processors and memory storing instructions that, in response to execution of the instructions by the one or more processors, cause the one or more processors to:
- access, from a code base, a sequence of edits made to a source code snippet over time;
- convert the sequence of edits to a corresponding sequence of graphs;
- independently apply each of the sequence of graphs as input across a graph neural network (GNN) to generate a respective sequence of edit embeddings;
- iteratively apply each edit embedding of the sequence of edit embeddings as input across a recurrent neural network (RNN) to generate a respective sequence of outputs, wherein additional data generated from a previous iteration is applied as additional input across the RNN during the next iteration and each iteration produces an output that may represent a prediction of what the next edit to the source code snippet will be;
- once all of the edit embeddings have been iteratively applied across the RNN, determining the final output from the last iteration of the sequence of outputs generated based on the RNN, wherein the final output includes the predicted next edit of the source code snippet; and
- applying the next edit as a snippet in the code base or a different code base.

8. The system of claim 7, wherein the sequence of graphs comprises a sequence of abstract syntax trees.

9. The system of claim 7, wherein the final output comprises a distribution over a set of candidate source code edits.

10. The system of claim 7, wherein the next edit is applied as the snippet in the different code base.

* * * * *